US007966461B2

(12) United States Patent
Chen et al.

(10) Patent No.: US 7,966,461 B2
(45) Date of Patent: Jun. 21, 2011

(54) APPARATUS AND METHOD FOR PROGRAMMING FUNCTIONS OF DISPLAY

(75) Inventors: Chien-Liang Chen, Hsinchu County (TW); Chih-Chiang Chiu, Taipei County (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 377 days.

(21) Appl. No.: 12/244,397

(22) Filed: Oct. 2, 2008

(65) Prior Publication Data

US 2009/0096802 A1 Apr. 16, 2009

(30) Foreign Application Priority Data

Oct. 16, 2007 (TW) ............................... 96138682 A

(51) Int. Cl.
*G06F 12/02* (2006.01)

(52) U.S. Cl. ........ 711/154; 345/531; 711/103; 711/105; 711/156

(58) Field of Classification Search .................. 711/154, 711/103, 105, 156; 345/531
See application file for complete search history.

(56) References Cited

U.S. PATENT DOCUMENTS

2007/0011396 A1* 1/2007 Singh et al. .................. 711/105

* cited by examiner

*Primary Examiner* — Jae U Yu
(74) *Attorney, Agent, or Firm* — WPAT, PC; Justin King

(57) ABSTRACT

The present invention provides an apparatus for programming functions of a display. The apparatus comprises a memory, a programming device, and a program code checking unit. The memory is for storing a program code. The programming device coupled to the memory is for reading the program code with a predetermined length from the memory. The program code with the predetermined length is part of the program code. The program code checking unit coupled to the programming device is for checking whether the program code with the predetermined length is consistent with a predetermined state, and for selectively generating a control signal. Under control of the control signal, the programming device determines whether to write the program code with the predetermined length into a memory of the display.

7 Claims, 5 Drawing Sheets

APPARATUS AND METHOD FOR PROGRAMMING FUNCTIONS OF DISPLAY

BACKGROUND OF THE INVENTION

1. Field of the Invention

The present invention relates to an apparatus and a method for programming functions of a display, especially to an apparatus and a method capable of checking a program code to reduce programming time.

2. Description of the Prior Art

Traditionally, programming functions of a display usually utilizes an apparatus shown in FIG. 1. The apparatus 100 for programming functions of a display comprises a memory 110 and a programming device 120. The memory 110 stores a program code used to update the functions of the display. The programming device 120 is coupled to the memory 110 and a memory 130 of the display. Thus, the programming device 120 reads the program code from the memory 110, and then writes the program code into the memory 130 of the display, so as to update the functions of the display.

The memory 130 of the display is typically a flash memory, which is programmed in unit of a page. The data amount of a page has a limited maximum, which is usually 256 bytes. The data amount of each page cannot be larger than this limited maximum. Therefore, the data amount of each page can be set equal to 256 bytes, 128 bytes, 64 bytes, etc. for programming.

FIG. 2 shows a diagram of writing the program code of a memory 210 into a flash memory 220. The memory 210 is divided into a plurality of pages, namely, the pages 212, 214 . . . , and 216. Now assuming that each page has 256 bytes, thus the pages 212, 214 . . . , and 216 have 256 bytes respectively. When the flash memory 220 is being programmed, the reading process starts at an initial position of the memory 210 to read the data amount of one page, namely, to read the page 212, and then the page 212 is written into a register (not shown). Next, the page 212 in the register is written into the flash memory 220, and the written position in the flash memory 220 corresponds to the relative position of the page 212 in the memory 210. The written page 222 starts from an initial position of the flash memory 220, and it occupies a data amount of one page, namely, 256 bytes in this embodiment.

Next, the page 214 is read from the memory 210 and written into the register, and then the page 214 in the register is written into the flash memory 220 to form the page 224. The relative position of the page 224 in the flash memory 220 corresponds to the relative position of the page 214 in the memory 210; that is, in the flash memory 220, the page 224 follows the page 222. By repeating the above procedures, each page of the memory 210 is written into the flash memory 220 in turn until the last page 216 of the memory 210 is read and written into the flash memory 220 to form the page 226.

However, if the flash memory 220 is programmed in this manner, regardless of the content of the page read from the memory 210, this page shall be written into the flash memory 220 completely. Even if the content of the read page is empty, the programming procedures for this empty page shall still be performed in the flash memory 220, which causes a waste of time.

SUMMARY OF INVENTION

It is therefore a primary objective of the claimed invention to provide an apparatus and a method for programming functions of a display, especially an apparatus and a method capable of checking whether a program code with a predetermined length is consistent with a predetermined state before writing the program code with the predetermined length, so as to reduce time for writing the program code.

According to an embodiment of the claimed invention, an apparatus for programming functions of a display is disclosed. The apparatus comprises a memory, a programming device, and a program code checking unit. The memory is for storing a program code. The programming device coupled to the memory is for reading the program code with a predetermined length from the memory. The program code with the predetermined length is part of the program code. The program code checking unit coupled to the programming device is for checking whether the program code with the predetermined length is consistent with a predetermined state, and for selectively generating a control signal. Under control of the control signal, the programming device determines whether to write the program code with the predetermined length into the memory of the display.

According to another embodiment of the claimed invention, a method for programming functions of a display is disclosed. The method comprises: reading a program code with a predetermined length from a memory; checking whether the program code with the predetermined length is consistent with a predetermined state, and selectively generating a control signal; and determining whether to write the program code with the predetermined length into a memory of the display according to the control signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
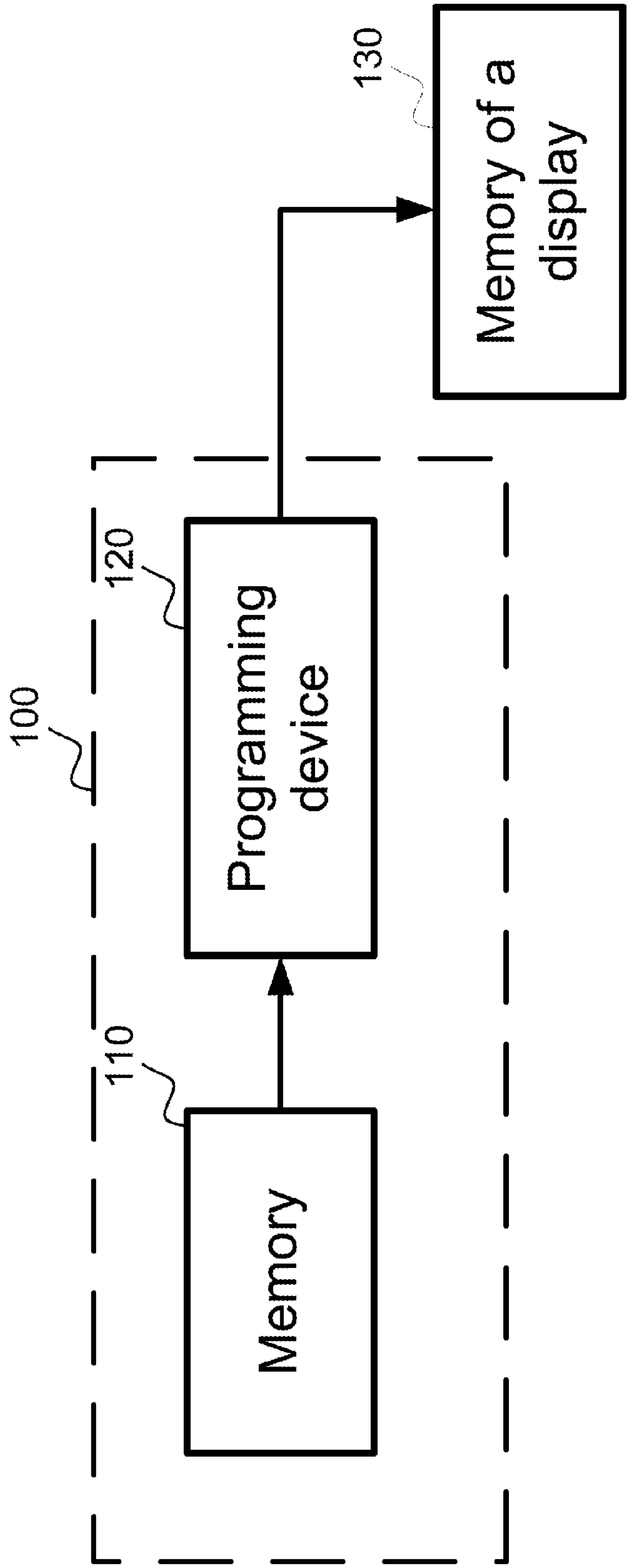
FIG. 1 is a diagram of the conventional apparatus for programming functions of a display.
Figure 2:
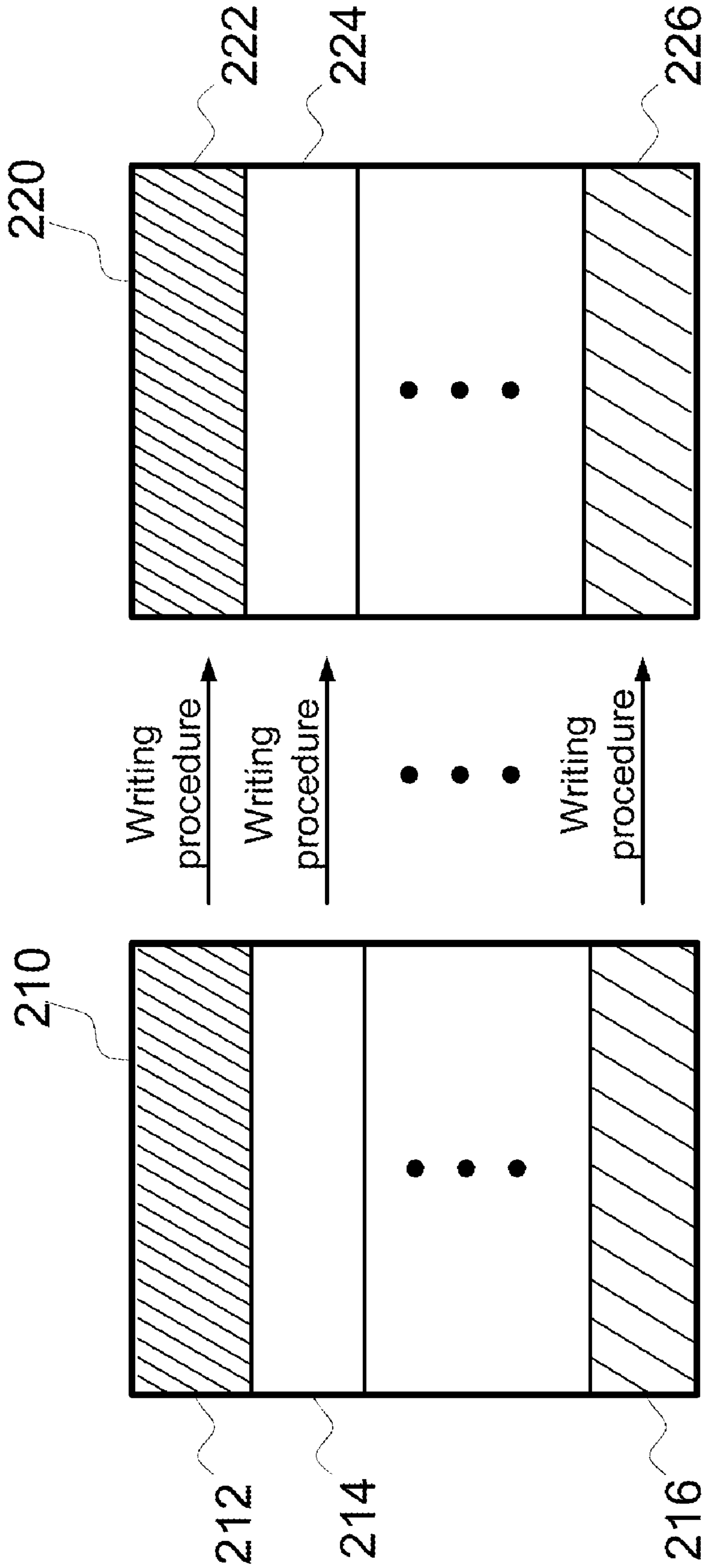
FIG. 2 is a diagram of writing a program code of a memory 210 into a flash memory 220.
Figure 3:
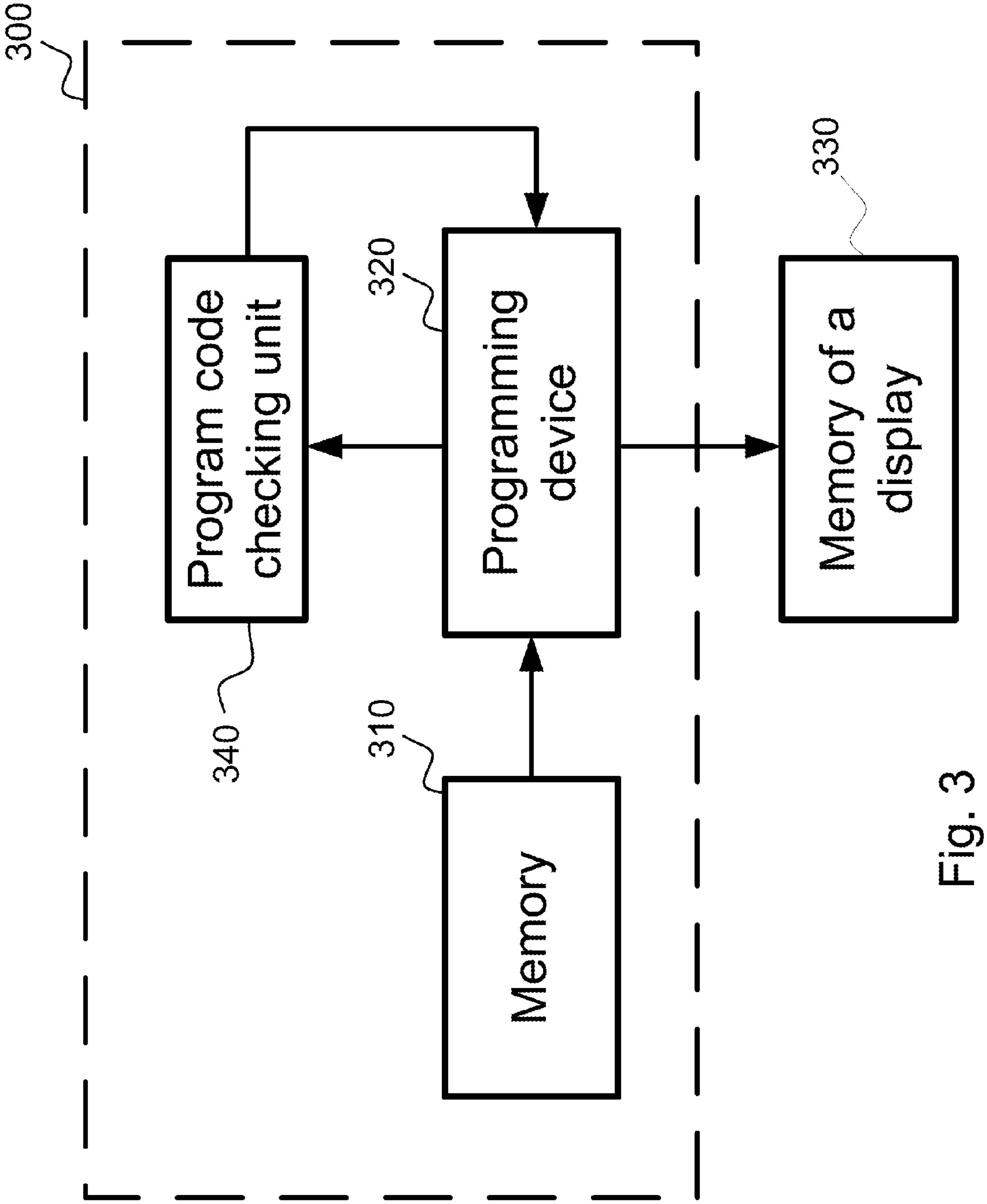
FIG. 3 is a diagram of an apparatus for programming functions of a display according to an embodiment of the claimed invention.
Figure 4:
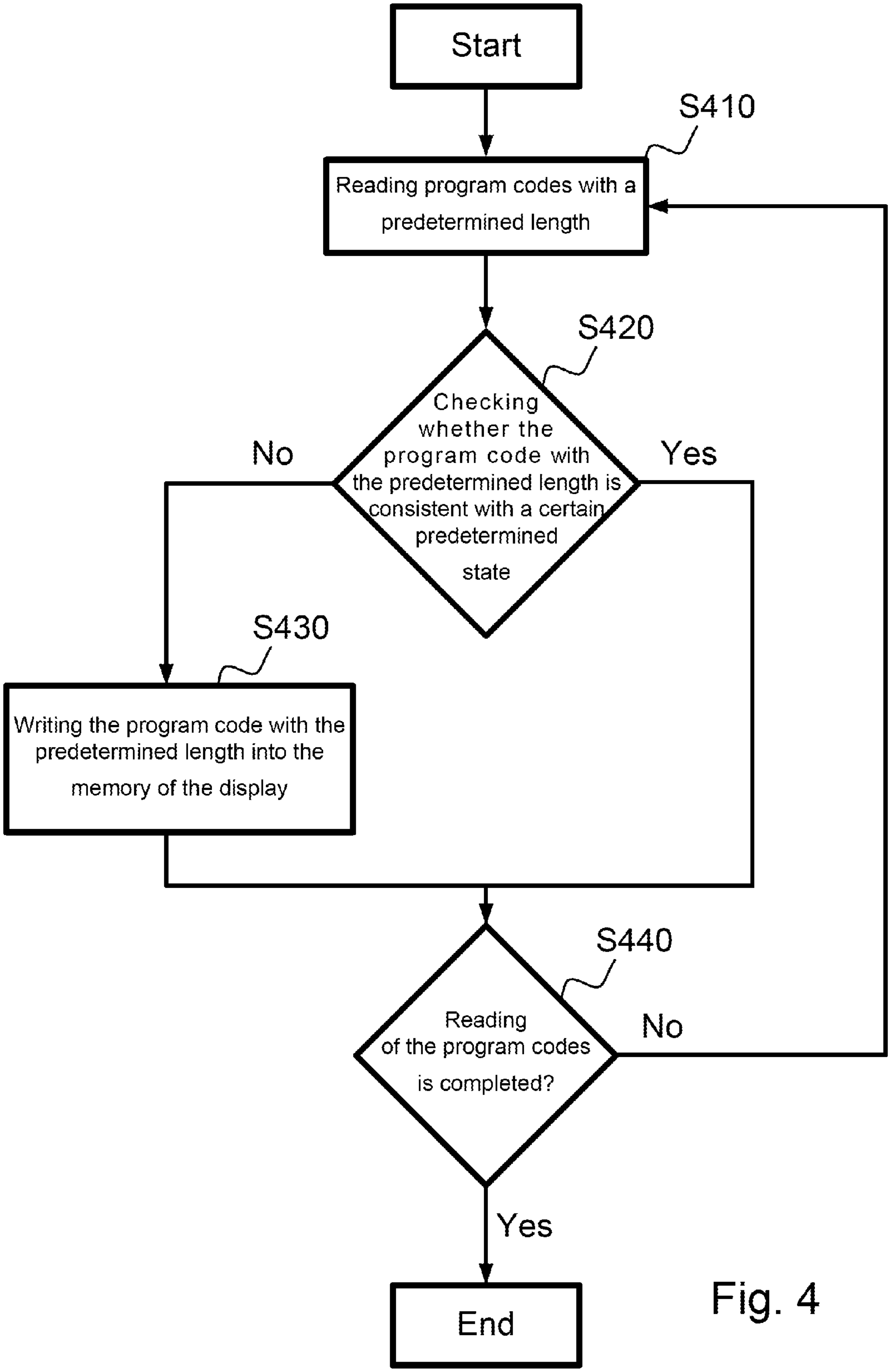
FIG. 4 is a flowchart of a method for programming functions of a display according to an embodiment of the claimed invention.

FIG. 3 shows an apparatus for programming functions of a display according to an embodiment of the claimed invention. The apparatus 300 comprises a memory 310, a programming device 320, and a program code checking unit 340. The memory 310 stores program codes used to update the functions of the display. The programming device 320 is coupled to the memory 310 and a memory 330 of the display, and the program code checking unit 340 is coupled to the programming device 320. In the present embodiment, examples of the display include a monitor, an analog TV, and a digital TV. To understand further the operating procedures of this present invention, please also refer to FIG. 4, illustrating a flowchart of a method for programming the functions of a display according to an embodiment of the claimed invention. When the functions of the display are being programmed, the programming device 320 reads a section of the program code with a predetermined length at a time from the memory 310 (Step 410 in FIG. 4), and then sends the read program code to the program code checking unit 340. As mentioned in the prior art, the memory 330 of the display is typically a flash memory, which is programmed in an unit of a page, and the data amount of a page has a limited maximum; wherein, the data amount that the programming device 320 reads each time equals the data amount of one page, and so the data amount contained within the program code that each time the programming device 320 reads is not larger than this limited maximum. Assuming that this limited maximum is 256 bytes, then the data amount of one page or the data amount of the program code that each time the programming device 320 reads has a predetermined length and such length is less than or equal to 256 bytes, such as 256 bytes, 128 bytes, 64 bytes, etc.

In step S420, the program code checking unit 340 checks whether the program code with the predetermined length is consistent with a certain predetermined state. If the program code with the predetermined length is consistent with the predetermined state, the program code checking unit 340 generates a control signal to the programming device 320. The predetermined state is that each bit of the program code with the predetermined length is a logical "1", or, in other words, each byte of the program code with the predetermined length has a value of FF (hexadecimal). If the program code with a predetermined length of 256 bytes is consistent with the predetermined state, then all bits (256*8) are logical "1", or the value of each of the 256 bytes is FF (hexadecimal). As those skilled in the flash memory know, the flash memory is erased before data is written into the flash memory; and after erasing, each bit of the flash memory becomes logical "1", namely, each byte of data is FF (hexadecimal). Hence, if the program code with the predetermined length is consistent with the predetermined state, then the memory 330 of the display does not need to change the logical value of each bit when the program code with the predetermined length is written into the memory 330 of the display. More specifically, when this kind of data is read by the programming device 320, no physical data writting action on the memory 330 of the display is necessary. Therefore, if the programming device 320 does not receive the control signal, the programming device 320 will write the currently-read program code with the predetermined length into the memory 330 of the display according to the relative location of the currently-read program code in the memory 310 (S430). On the other hand, if the programming device 320 receives the control signal, the programming device 320 shall not perform a physical writing action.

Figure 5:
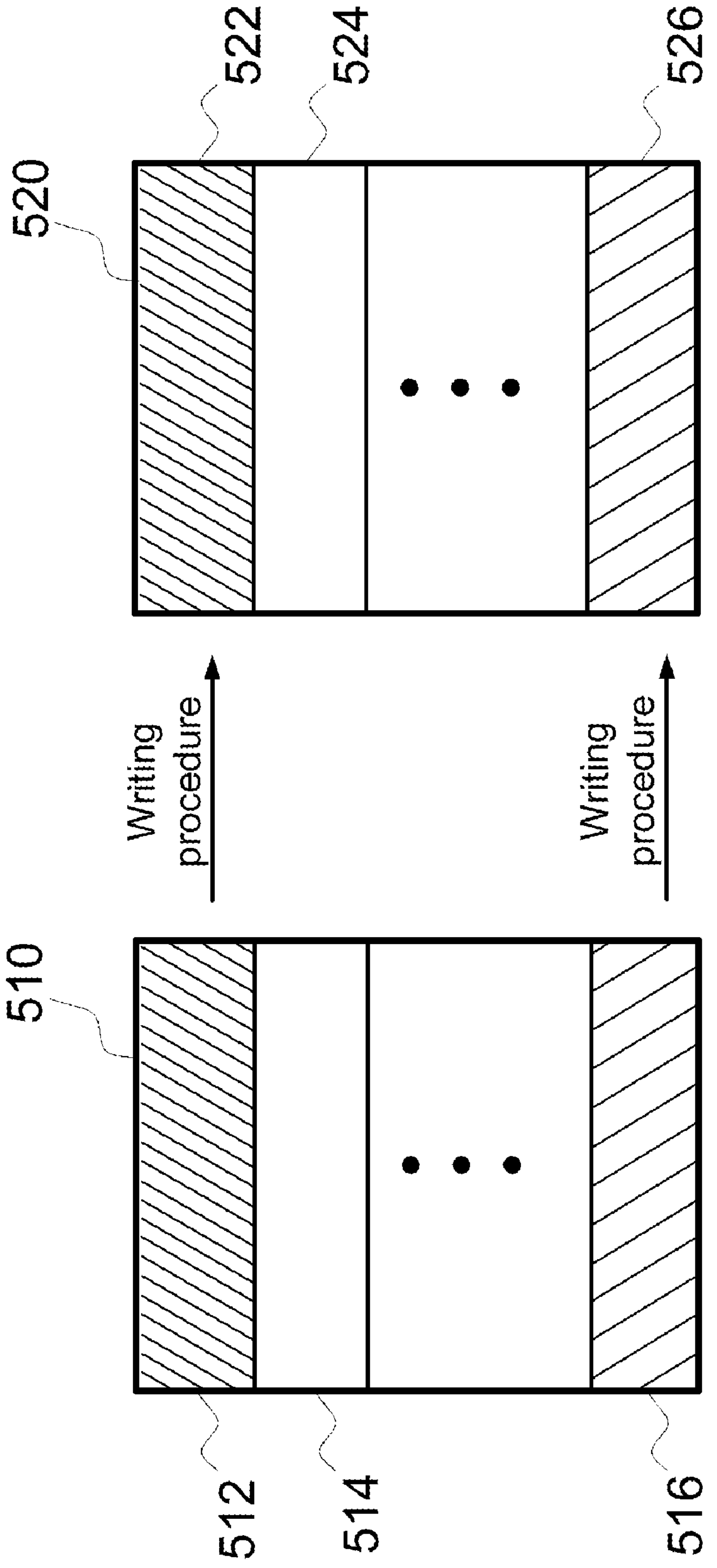
FIG. 5 is a diagram of a sector 510 of a memory 310 and the state of data of a writing sector 520 of a memory 330 of the display.

To be more specific, please refer to FIG. 5, showing a sector 510 of the memory 310 which is used for storing program codes and a to-be-written sector 520 of the memory 330 of the display. As shown in FIG. 5, the sector 510 occupies a portion of the memory 310, and the sector 520 is a to-be-written sector in the memory 330 of the display. In addition, program codes 512 and 516 both with a predetermined length are not consistent with the predetermined state, and the program code 514 with a predetermined length is consistent with the predetermined state. Therefore, the program codes 512 and 516 both with the predetermined length can be regarded as non-empty sections of the program codes, and the program code 514 with the predetermined length can be regarded as an empty section of the program codes. In practice, the programming device 320 reads the program code 512 with the predetermined length from the sector 510, and then the program code 512 is sent to the program code checking 340 to be checked. Since the program code 512 with the predetermined length is not consistent with the predetermined state, the program code checking unit 340 does not generate the control signal. As a result, the programming device 320 writes the program code 512 into the sector 520 to form the page 522 according to the relative position of the program code 512 with the predetermined length in the sector 510.

Next, the programming device 320 determines whether the reading of the program codes is completed (S440). Once the reading is completed, the procedures of writing the program code finishes. If the reading of the program codes in the sector 510 is not completed, the programming device 320 reads next program code 514 with the predetermined length, and then the program code 514 with the predetermined length is sent to the program code checking 340 for checking. Since the program code 514 with the predetermined length is consistent with the predetermined state, the program code checking unit 340 generates the control signal, and the programming device 320 skips the procedures of writing the program code 514 with the predetermined length into the sector 520; thereby the time for writing the program code 514 with the predetermined length is saved. Similarly, the program code 516 with the predetermined length is read, checked, and written in the same way, so the page 526 is generated in the corresponding position within the sector 520. The page 526 corresponds to the program code 516 with the predetermined length. The procedures repeat continuously until all program codes are written into the memory 330 of the display.

In summary, in the apparatus according to the present invention, all program codes are checked by the program code checking unit before being written into the memory of the display. If the program code to be written is an empty section, the procedures of writing this program code are skipped, such that the total processing time in writing program codes is greatly saved.

Those skilled in the art will readily observe that numerous modifications and alterations of the device and method may be made while retaining the teachings of the invention. Accordingly, the above disclosure should be construed as limited only by the metes and bound of the appended claims.

What is claimed is:

1. An apparatus for programming functions of a display, comprising:

a memory for storing a program code;

a programming device coupled to the memory, the programming device reads the program code with a predetermined length from the memory, wherein the program code with the predetermined length is part of the program code; and a program code checking unit coupled to the programming device, for generating a control signal by checking whether the program code with the predetermined length is consistent with a predetermined state, wherein the predetermined state is that each bit of the program code with the predetermined length is logical "1", and when the program code with the predetermined length is consistent with the predetermined state, the control signal controls the programming device not to write the program code with the predetermined length into the memory of the display;

wherein when the program code with the predetermined length is consistent with the predetermined state, and the logical value of each bit of the memory of the display corresponding to the program code with the predetermined length does not need to be changed.

2. The apparatus of claim 1, wherein a data amount contained in the program code with the predetermined length equals a data amount of a programming unit of the memory of the display.

3. The apparatus of claim 1, wherein the memory of the display is a flash memory.

4. The apparatus of claim 1, wherein the programming device repeats reading the program code from the first memory by a section of a predetermined length; and the programming device repeats reading until completing reading the program code.

5. A method for programming functions of a display, comprising:

reading a program code with a predetermined length from a memory; and checking whether the program code with the predetermined length is consistent with a predetermined state, and selectively generating a control signal when the program code with the predetermined length is consistent with a predetermined state, wherein the predetermined state is that each bit of data of the program code with the predetermined length is logical "1" and when the program code with the predetermined length is consistent with the predetermined state, the control signal indicates that the program code with the predetermined length need not to be written into the memory of the display;

wherein the logical value of each bit of the memory of the display corresponding to the program code with the predetermined length does not need to be changed when the control signal is generated.

6. The method of claim 5, wherein a data amount contained in the program code with the predetermined length equals a data amount of a programming unit of the memory of the display.

7. The apparatus of claim 5, wherein the method repeats reading the program code from the first memory by a section of a predetermined length; and the method repeats reading until completing reading the program code.

* * * * *